(12) United States Patent
Konno

(10) Patent No.: US 7,957,047 B2
(45) Date of Patent: Jun. 7, 2011

(54) LASER PROJECTION DEVICE

(75) Inventor: Kenji Konno, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 528 days.

(21) Appl. No.: 12/001,591

(22) Filed: Dec. 12, 2007

(65) Prior Publication Data

US 2008/0143979 A1  Jun. 19, 2008

(30) Foreign Application Priority Data

Dec. 15, 2006 (JP) ................. 2006-337780

(51) Int. Cl.
*G02B 26/08* (2006.01)

(52) U.S. Cl. ............. 359/215.1; 359/205.1; 250/227.26

(58) Field of Classification Search .... 359/196.1–226.3, 359/838, 871–872; 347/225–260; 250/227.26; 353/98–99

See application file for complete search history.

(56) References Cited

U.S. PATENT DOCUMENTS

| 6,285,489 B1 * | 9/2001 | Helsel et al. ................. 359/291 |
| 6,538,799 B2 * | 3/2003 | McClelland et al. ......... 359/291 |
| 2003/0112485 A1 * | 6/2003 | Nishihata et al. ............. 359/208 |
| 2004/0080799 A1 * | 4/2004 | Ishihara ........................ 359/202 |
| 2006/0109427 A1 * | 5/2006 | Konno et al. .................. 353/78 |

FOREIGN PATENT DOCUMENTS

| JP | 11-84291 A | 3/1999 |
| JP | 2001-281583 A | 10/2001 |
| JP | 2006-178346 A | 7/2006 |
| JP | 2006-227044 A | 8/2006 |

* cited by examiner

*Primary Examiner* — Stephone B Allen
*Assistant Examiner* — Jennifer L. Doak
(74) *Attorney, Agent, or Firm* — Sidley Austin LLP

(57) ABSTRACT

A laser projection device includes: an incidence optical system condensing laser light, a scanning device deflect the laser light in a first scanning direction and a second scanning direction with a mirror, and a projection optical system guiding the deflected light to a surface to be scanned. The scanning device performs the deflection in the first scanning direction by resonant driving and performs the deflection in the second scanning direction by non-resonant driving. The incidence optical system has different optical powers in the first scanning direction and the second scanning direction, and makes light incident on the scanning device in a convergent state in the first scanning direction and in a substantially parallel light state in the second scanning direction. The projection optical system has a negative optical power in the first scanning direction.

20 Claims, 10 Drawing Sheets

LASER PROJECTION DEVICE

This application is based on Japanese Patent Application No. 2006-337780 filed on Dec. 15, 2006, the contents of which are hereby incorporated by reference.

BACKGROUND OF THE INVENTION

1. Field of the Invention

The present invention relates to a laser projection device, for example, a scanning laser projection device (laser projector or the like) that deflects and scans laser light with a mirror to project an image onto a screen surface.

2. Description of Related Art

Various laser projection devices have been suggested (for example, see Patent Documents 1 and 2) which form a two-dimensional image by deflecting laser light in mutually orthogonal first and second scanning directions and then two-dimensionally scanning a surface to be scanned with a beam spot. For the deflection of laser light, a mirror, such as a polygon mirror, a galvanomirror, a MEMS (Micro Electro Mechanical Systems) mirror, or the like, is typically used. However, mirrors, such as the galvanomirror, the MEMS mirror, and the like, that are sinusoidally driven suffer from several problems. For example, these mirrors face the problem that the scanning speed on the surface to be scanned slows down at the periphery, which results in image quality deterioration due to nonuniformity in the amount of light. In addition, these mirrors face the problem that distortion occurs on the two-dimensional image formed on the surface to be scanned. Attempts to solve such problems lead to complication or upsizing of an optical system or increases loads imposed on an electrical circuit, etc.

A laser projection device described in Patent Document 3, in order to achieve both ensuring the constant-speed scanning performance and correction of projection distortion, uses optical surfaces of different shapes for directions horizontal to and vertical to laser light after deflected. A laser projection device described in Patent Document 4, in order to achieve downsizing of the device, makes laser light with different convergence performance in a main-scanning direction and a sub-scanning direction incident onto a mirror sinusoidally driven.

[Patent Document 1] JP-A-2001-281583
[Patent Document 2] JP-A-H11-84291
[Patent Document 3] JP-A-2006-178346
[Patent Document 4] JP-A-2006-227044

The laser projection device described in Patent Document 3 uses a MEMS mirror that deflects laser light in two directions, i.e., the horizontal scanning direction and the vertical scanning direction in order to perform two-dimensional scanning. On the MEMS mirror, laser light converged is made incident in both the horizontal scanning direction and the vertical scanning direction, which does not contribute to the downsizing of the device due to no difference or a small difference, if any, in the degree of convergence of this laser light between the two directions. Moreover, the size of a projection optical system (approximately 40 times the mirror size) is large, in which point it is also hard to say that downsizing is achieved. Therefore, the configuration is not satisfactory to achieve a projection optical system compact in size and also capable of correcting arcsine characteristics and distortion. In any case, since light incident on the MEMS mirror is convergent light both in the horizontal scanning direction and the vertical scanning direction, it is required to adjust the position of the MEMS mirror in the both scanning directions. Moreover, since a projection optical system having a negative optical power is also used for the vertical scanning direction, there also arises a problem of difficulty in achieving constant speed performance in the vertical scanning direction.

In the laser projection device described in Patent Document 4, in order to achieve arcsine characteristics (constant speed scanning performance on a projection surface), laser light convergent in the horizontal scanning direction is made incident on the MEMS mirror. However, this laser projection device is configured to perform one-dimensional deflection and scanning, while not considering two-dimensional distortion. Moreover, the projection optical system is formed with one negative lens, and thus cannot correct two-dimensional distortion in principle.

SUMMARY OF THE INVENTION

In view of such circumstances, the present invention has been made, and it is an object of the invention to provide a laser projection device compact in size and also capable of providing a high-quality, bright image without distortion generated in two-dimensional scanning.

According to one aspect of the invention, a laser projection device includes: a scanning device performing deflection in a first scanning direction by resonant driving and performing deflection in a second scanning direction by non-resonant driving, an incidence optical system having different optical powers in the first scanning direction and the second scanning direction and making light incident on the scanning device in a convergent state in the first scanning direction and in a substantially parallel light state in the second scanning direction; and a projection optical system having a negative optical power in the first scanning direction.

According to another aspect of the invention, a laser projection device includes: a laser light source; an incidence optical system condensing laser light emitted from the laser light source; a scanning device deflecting the laser light exiting from the incidence optical system with a mirror in a first scanning direction and a second scanning direction vertical to the first scanning direction; a projection optical system guiding the laser light exiting from the scanning device to a surface to be scanned. The incidence optical system makes the laser light convergent in the first scanning direction and substantially parallel light in the second scanning direction. The scanning device performs only the deflection in the first scanning direction by resonant driving. The projection optical system is formed of two optical elements, one of which includes a reflective surface having a stronger positive optical power toward periphery in the first scanning direction, and the other of which has a stronger negative optical power toward the periphery in the first scanning direction, so that the projection optical system has a negative optical power in the first scanning direction as a whole.

DETAILED DESCRIPTION OF THE PREFERRED EMBODIMENTS

Figure 1:
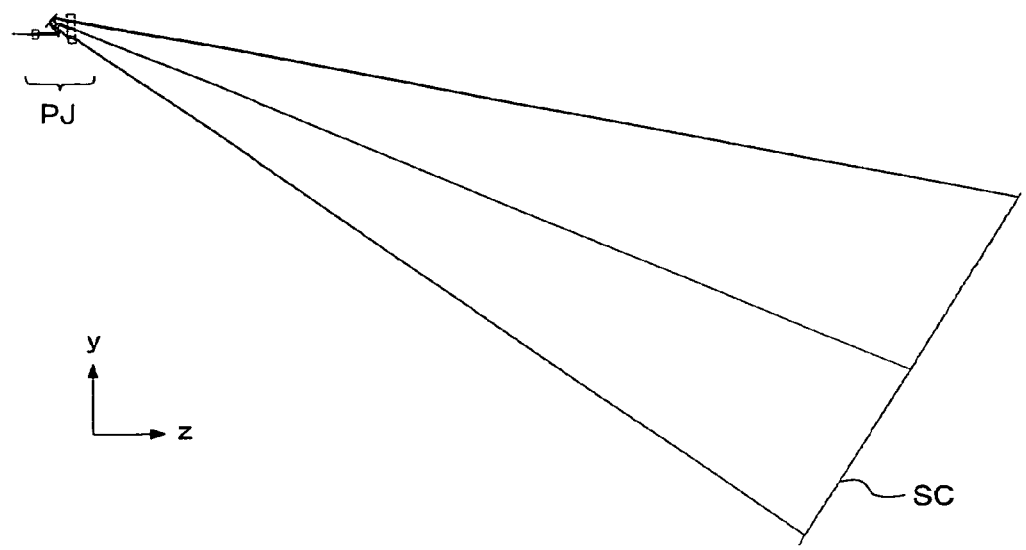
FIG. 1 is an overall view showing an optical path and optical configuration in a vertical scanning cross section according to a first embodiment (Example 1) of the present invention.

Hereinafter, embodiments, etc. of a laser projection device according to the present invention will be described with reference to the accompanying drawings. The laser projection device according to the invention includes: a laser light source; an incidence optical system that condenses laser light emitted from the laser light source; a scanning device (for example, MEMS mirror) that deflects, with a mirror, the laser light exiting from the incidence optical system; and a projection optical system that guides the laser light deflected by the scanning device to a surface to be scanned. The scanning device, in order to perform two-dimensional scanning, is configured to deflect, with the mirror, laser light in mutually orthogonal first and second scanning directions. The first and second scanning directions for deflecting laser light, in a case of, for example, a scanning laser projector, correspond to a horizontal scanning direction and a vertical scanning direction, respectively with respect to a two-dimensional image formed.

A typical projection method illuminates a two-dimensional spatial modulation element (a typical liquid crystal panel, digital micromirror device, or the like) and then projects an image displayed by this spatial modulation element onto a screen surface. On the other hand, the laser projection device according to the invention adopts a method completely different from the aforementioned method, that is, a laser scanning method. The laser scanning method makes laser light incident on the scanning device by the incidence optical system and then projects the laser light which has been subjected to two-dimensional scanning by the scanning device, onto the surface to be scanned by the projection optical system. This method can project a two-dimensional image onto the screen surface by modulating the laser light source in accordance with information on the scanning device position. The adoption of the laser scanning method also makes it possible to achieve very compact configuration from the laser light source to the projection optical system.

With the laser scanning method, laser light is subjected to reciprocating scanning with the mirror. For example, to achieve a XGA resolution at a frame rate of 1/60 seconds, vertical scanning is at 60 Hz and the resolution in the vertical scanning direction is 768 dots; thus, the horizontal scanning requires a very high-speed reciprocating motion of 60×768/2=23 kHz (division by 2 is performed for reciprocating scanning). To greatly change the mirror angle at high speed in this manner, resonance is typically employed. Use of a MEMS resonance mirror permits reciprocating motion at a large amplitude and a high speed. The MEMS employs an electromagnetic driving method, a piezoelectric driving method, or an electrostatic driving method. The piezoelectric driving method is suitable for scanning with a large mirror at a high speed, while the other types of mirrors face a problem of insufficient mirror size and insufficient speed. Therefore, the piezoelectric driving method is preferable as a mirror driving method. Examples of a resonance mirror required to be driven at a high speed include a MEMS mirror (FIG. 16) to be described in detail later. Resonant driving thereof, in a mirror configuration having a mirror part held by a torsion bar, is achieved by vibrating the mirror part with respect to the torsion bar as a center.

Although deflection in the horizontal scanning direction requires resonant driving of the mirror, deflection in the vertical scanning direction does not require resonant driving of the mirror, because vertical scanning is performed through low-speed driving at 60 Hz as described above. Since the low-speed driving can be performed, driving, although reciprocating driving, can be relatively freely performed in a saw-like form, a triangular form, or the like. Moreover, it is possible to ensure a relatively large time in which the driving is linear (at constant speed), which permits a greater brightness of the projector. That is, in the low-speed driving, an image formation region can be made relatively large, which permits an improvement in the brightness. Therefore, non-resonant driving of the mirror is suitable for the deflection in the vertical scanning direction.

In the resonant driving, the mirror reciprocates, whereby so-called sinusoidal driving is performed in which the scanning speed is fastest at the center of the reciprocation and zero at the most peripheral part. The sinusoidal driving faces two problems. First, the difference in the scanning speed induces in a difference in the luminance on the screen surface, which makes the image plane periphery brighter. Second, the difference in the scanning speed induces a difference in the dot size between the image plane periphery and the image plane center. The both are not preferable since they cause considerable deterioration in the projected image quality. In order to solve these problems, reducing the brightness at the image plane periphery reduces the overall brightness, and also keeping the dot size constant by a control circuit increases the load on the circuit, which leads to upsizing and cost increase of the device.

From the above-mentioned viewpoint, it is preferable that the scanning device perform deflection in the horizontal scanning direction (first scanning direction) by resonant driving of the mirror and perform deflection in the vertical scanning direction (second scanning direction) by non-resonant driving of the mirror. In performing the deflection in the horizontal scanning direction by the resonant driving (sinusoidal driving) of the mirror, to achieve constant-speed scanning on the screen surface, it is required to correct arcsine by the projection optical system. To provide arcsine characteristics with a compact projection optical system, it is preferable that convergent light be made incident on the mirror of the scanning device and that the projection optical system be provided with a negative optical power. Moreover, in performing the deflection in the vertical scanning direction by the non-resonant driving of the mirror, to achieve constant-speed scanning on the screen surface, it is required to provide the projection optical system with a fθ (or f tan θ) characteristic. To provide this characteristic to a compact projection optical system, it is preferable that the projection optical system be provided with a weak positive optical power (for example, a convex lens with a weak optical power be used).

In the case of two-dimensional scanning, pincushion distortion occurs on the scanned surface side by nature. Constructing the projection optical system only with a negative lens contributes to the distortion. Thus, arranging a mirror between the scanning device and the negative lens and providing the periphery thereof with a positive optical power permits providing such a design solution that achieves a favorable balance between the distortion and the arcsine characteristic. Therefore, for correcting the distortion, basically preferable configuration achieves this correction with the projection optical system provided with an optical element having a negative optical power and an optical element having a positive optical power.

Configuration such that laser light convergent both in the horizontal scanning direction and the vertical scanning direction is made incident on the mirror (for example, MEMS mirror) of the scanning device requiring mirror adjustment both in the horizontal scanning direction and the vertical scanning direction, as described later in detail. In a case where the laser light incident on the mirror is parallel light in the vertical scanning direction, mirror mounting adjustment is required only in the horizontal scanning direction. Therefore, when a mirror (for example, two-dimensional MEMS mirror) for performing deflection for two-dimensional scanning is used, the complicated adjustment in the two directions is no longer required. Thus, when two mirrors for performing deflection for one-dimensional scanning are used, the number of components required for the mounting adjustment decreases. In either case, cost reduction can be achieved, which is preferable. With configuration using a projection optical system with a negative optical power also in the vertical scanning direction, it is difficult to provide constant speed performance in the vertical scanning direction by the effect of widening peripheral light.

Figure 13:
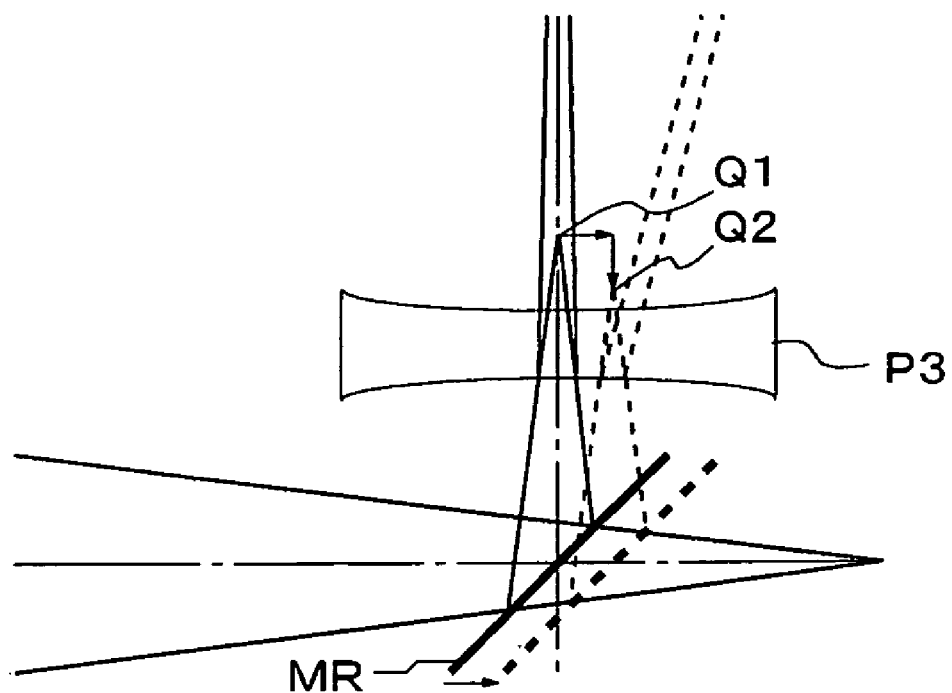
FIG. 13 is a diagram illustrating a relationship between parallelism of light incident on a mirror and mirror mounting error.

A relationship between the mirror adjustment and the degree of parallelism of laser light incident thereon will be further described in detail. As shown in FIG. 13, assume a case where convergent light is incident on the mirror MR. When a mounting error of the mirror MR occurs, there arises a shift in the reflection position as indicated by a dotted line in FIG. 13. Accordingly, an object point position for laser light incident on a projection optical system P3 moves from Q1 to Q2, which causes a difference in the object point position and the object point distance. Therefore, a difference arises between the image position and image focus in imaging on a screen (not shown). To eliminate this difference, it is required to accurately perform mirror arrangement in the scanning device (for example, MEMS mirror), which requires mirror adjustment for precisely holding the mirror.

A close object distance (large degree of convergence) results in large image point movement due to mounting error. If the mounting error of the mirror MR is 50 μm, the object distance is 100 mm, and the projection distance of the projection optical system P3 is 400 mm, error in object point movement approximately corresponding to magnification of the object distance and the projection distance occurs on the image plane. That is, it is approximately 4 times in this case, and thus there is a shift of 200 μm on the screen. For the focal point error, it is a square of lateral magnification, and thus there is a shift of 16 times and a focus error of 800 μm. These errors depend on the resolution on the screen, but in terms of providing favorable imaging, it can be said to be large as errors for a dot of approximately 300 μm in a cause where the length of a longer side of the screen is 300 mm with a typical XGA or equivalent.

When the same calculation is made for the laser projection device described in Patent Document 3, the object distance is 121.6 mm, the projection distance is approximately 240 mm, and the screen lateral width is 243.5 mm with SVGA (800 dots), thus resulting in a dot of 0.3 mm. The magnification is approximately twice, and thus the longitudinal magnification is 4 times; thus, with an error of 50 μm on the screen, a focus error of 0.2 mm occurs. In this case, the error is very close to the permitted error limit, which results in a large projection optical system. Therefore, to provide a compact projection optical system with an arcsine characteristic, it is required to make the power a little larger. Making the power larger in this manner goes into a region where adjustment is unevitable.

Contrarily, in a case where parallel light is incident on the mirror MR, there arises no shift in the position of an image point formed by the projection optical system P3 and the focus position. Although a pupil shift occurs, if the degree of this shift is small, this shift does not influence the mounting error of the mirror MR. Although the mechanical error is typically in approximately several tens of micrometers, when the pupil diameter is 1 mm, the pupil shift is in approximately several percentages, which can be ignored. Therefore, in a case where substantially parallel light is incident on the mirror MR, shifts in the image position and the image focus due to the mounting error need not to be considered, which can eliminate the need for mirror adjustment. However, it is preferable that convergent light be made incident in the horizontal scanning direction (first scanning direction). The reason for this is as follows. In performing deflection in the horizontal scanning direction by resonant driving (sinusoidal driving) of the mirror, to provide an arcsine characteristic on the screen surface, it is required to combine incidence of convergent light onto the mirror MR and the use of an optical element (for example, negative lens) with a negative optical power in the projection optical system P3.

To provide the arcsine characteristic in a compact projection optical system, from the viewpoint of, in the horizontal scanning direction (first scanning direction), intensifying the negative optical power of the projection optical system and intensifying the convergence performance of laser light incident on the deflecting mirror, it is preferable that the laser projection device satisfy conditional formula (1) below:

$$0.3 > S(objH)/L > 0.03 \qquad (1),$$

where

S(objH) represents the object distance of the projection optical system with reference to the mirror in the first scanning direction; and L represents the projection distance with reference to an optical surface which is included in the projection optical system and located on the side closest to the surface to be scanned.

If the upper limit of the conditional formula (1) is exceeded, the convergence performance is weakened (since the negative optical power of the projection optical system is weakened), which results in insufficient effect of arcsine correction, thereby making it difficult to make correction at a large scanning angle in the horizontal scanning direction. Setting the scanning angle small narrows down the angle of view and thus reduces the screen size, thus resulting in failure to project a large image plane with the compact projection optical system. Moreover, increasing the distance from the optical element (for example, negative lens) with a negative optical power to the scanning device in order to provide the effect of arcsine correction results in upsizing of the projection optical system, which is not preferable. Contrarily, if the lower limit of the conditional formula (1) is exceeded, the convergence performance becomes too strong, which results in difficulties in correcting the curvature of field at the image plane periphery in the horizontal scanning direction, a problem concerned with the remaining amount of adjustment even after the mirror mounting error has been adjusted, or enhanced distortion in the diagonal direction of the image plane. This makes it difficult to achieve a favorable projection device.

It is further preferable that conditional formula (1a) below be satisfied:

$$0.3 > S(objH)/L > 0.1 \quad (1a).$$

This conditional formula (1a) defines, out of the conditional range defined by the conditional formula (1) above, a more preferable conditional range based on the aforementioned viewpoints, etc.

In the vertical scanning direction (second scanning direction), an fθ (or f tan θ) characteristic is required for constant-speed correction. A typical convex lens has an f tan θ characteristic for an infinite object, and this characteristic is equivalent to the fθ characteristic when the angle θ is small. A decrease in the focal length (that is, an increase in the power) results in a shift from this characteristic due to distortion. Therefore, it is preferable that laser light close to parallel light be made incident in the vertical scanning direction, and more specifically, it is preferable that conditional formula (2) below be satisfied:

$$|S(objV)|/L > 0.8 \quad (2),$$

where
   S(objV) represents the object distance of the projection optical system with reference to the mirror in the second scanning direction; and
   L represents the projection distance with reference to an optical surface which is included in the projection optical system and located on the side closest to the surface to be scanned.

If the conditional formula (2) is satisfied, the projection optical system maintaining the imaging relationship has a power weak in the vertical scanning direction, which makes it possible to achieve a favorable fθ (or f tan θ) characteristic. With the negative lens, although weak in optical power, deviation from the configuration described above results (that is, a ray of light is bent outward of the image plane). Thus, it is further preferable that the optical power be a positive optical power or a weak positive optical power.

It is further preferable that conditional formula (2a) below be satisfied:

$$|S(objV)|/L > 1.2 \quad (2a).$$

This conditional formula (2a) defines, out of the conditional range defined by the conditional formula (2) above, a more preferable conditional range based on the aforementioned viewpoints, etc.

Considering the above points, it is required to provide a great difference in the optical power of the incidence optical system between the horizontal scanning direction and the vertical scanning direction. That is, it is preferable that the incidence optical system be formed of an optical system, for example, an anamorphic optical system, which makes convergent light incident on the mirror in the first scanning direction (horizontal scanning direction), which makes substantially parallel light incident thereon in the second scanning direction (vertical scanning direction), and which has different optical powers in the first scanning direction and the second scanning direction. For the power ratio, it is preferable that conditional formula (3) below be satisfied:

$$3 > pwH/pwV > 1.2 \quad (3),$$

where
   pwH represents the optical power of the incidence optical system in the first scanning direction; and
   pwV represents the optical power of the incidence optical system in the second scanning direction.

If the upper limit of the conditional formula (3) is exceeded, the power ratio becomes too large, which results in a large difference in the pupil shape of the incidence optical system between the horizontal scanning direction and the vertical scanning direction. This means that a point image projected with the projection optical system is ellipsoidal-shaped formed long in the vertical scanning direction, which results in a problem of insufficient resolution in the horizontal scanning direction in the projection optical system. Contrarily, if the lower limit of the conditional formula (3) is exceeded, it is difficult to provide a difference in the required object distance between the horizontal scanning direction and the vertical scanning direction for the projection optical system supporting resonant driving (sinusoidal driving) in the horizontal scanning direction and non-resonant driving (low-speed driving) in the vertical scanning direction as described above, which is not preferable.

It is further preferable that conditional formula (3a) below be satisfied:

$$2 > pwH/pwV > 1.3 \quad (3a).$$

This conditional formula (3a) defines, out of the conditional range defined by the conditional formula (3) above, a more preferable conditional range based on the aforementioned viewpoints, etc.

Figure 14:
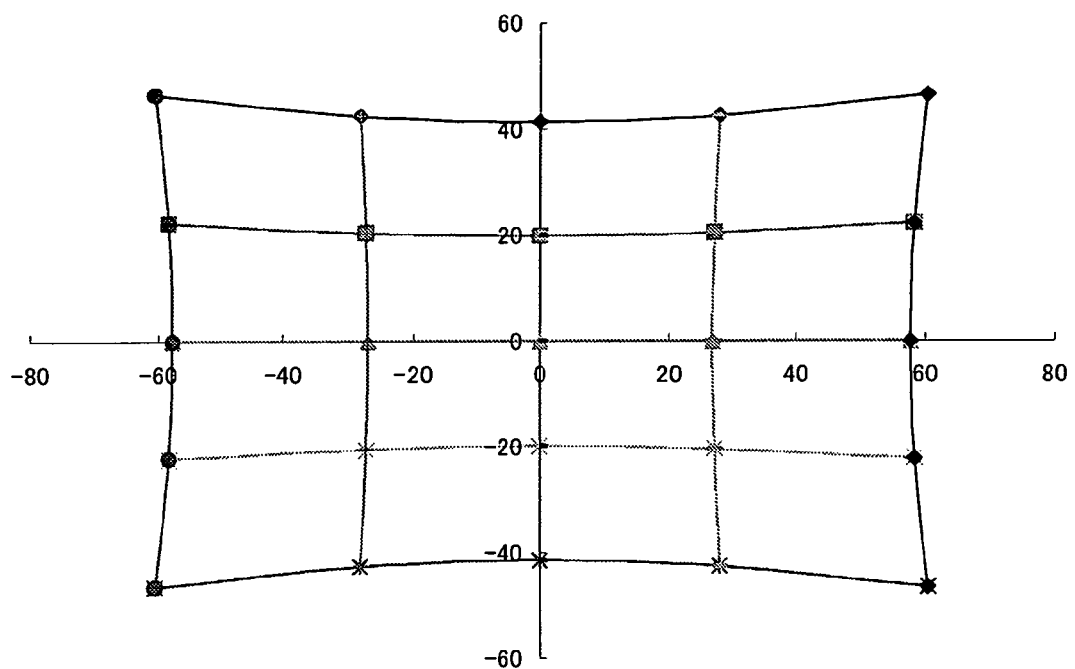
FIG. 14 is a distortion diagram illustrating distortion of an image when two-dimensional scanning is performed with the mirror only.

In performing two-dimensional scanning, only considering the horizontal scanning direction and the vertical scanning direction in a paraxial sense is insufficient, because this only considers lines vertical and horizontal to the image plane center. Thus, it is also required to consider constant speed performance and distortion for a skew ray of light representatively located at the four corners of the image plane. Typically, when light is irradiated to a MEMS mirror for two-dimensional scanning, under the absence of an optical system, pincushion distortion occurs at the image plane periphery. FIG. 14 shows one example of this. FIG. 14 is a distortion diagram for two-dimensional scanning performed with the mirror only (where the angle of incidence in the horizontal scanning direction is 0 degrees, the scanning angle in the horizontal scanning direction is 15 degrees, and the scanning angle in the vertical scanning direction is 11.25 degrees).

An imaging relationship can be maintained by satisfying the constant speed performance by utilizing the characteristic of the negative lens (characteristic of throwing peripheral light further away) and also by the convergence of the incidence optical system. With the characteristic of the negative lens, the pincushion distortion (FIG. 14) described above is large at the peripheral portion. Weakening the negative optical power only at the periphery breaks up the imaging relationship, thus resulting in failure to provide favorable point image performance. This proves that the degree of freedom of the optical element is insufficient with one negative lens (optical element having a negative optical power). The projection optical system requires at least one more degree of freedom, which requires one more optical element. That is, to eliminate distortion at the image plane periphery, maintain the constant speed performance, and maintain the imaging relationship, the projection optical system requires at least two optical elements. It is effective to use, as one of the optical elements, an optical element having a larger negative optical power toward the periphery in the horizontal scanning direction, and use, as the other of the optical elements, an optical element having a larger positive optical power toward the periphery in the horizontal scanning direction. Therefore, it is preferable that the projection optical system be composed of at least two optical elements, one of which has a stronger positive optical power toward the periphery in the first scanning direction (horizontal scanning direction), and the other of which has a stronger negative optical power toward the periphery in the first scanning direction.

Figure 2:
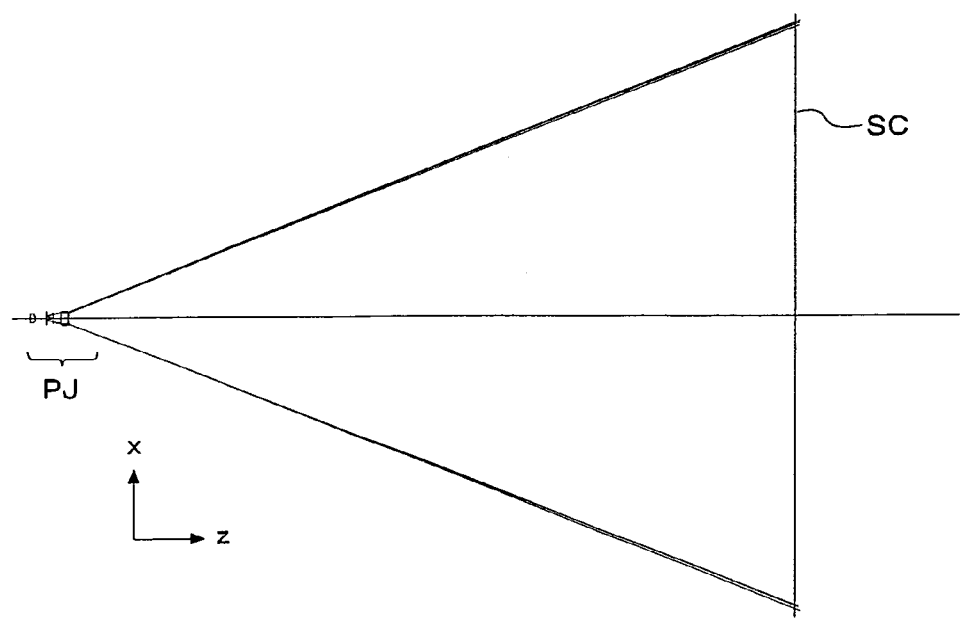
FIG. 2 is an overall view showing an optical path and optical configuration in a horizontal scanning cross section according to the first embodiment (Example 1)
Figure 3:
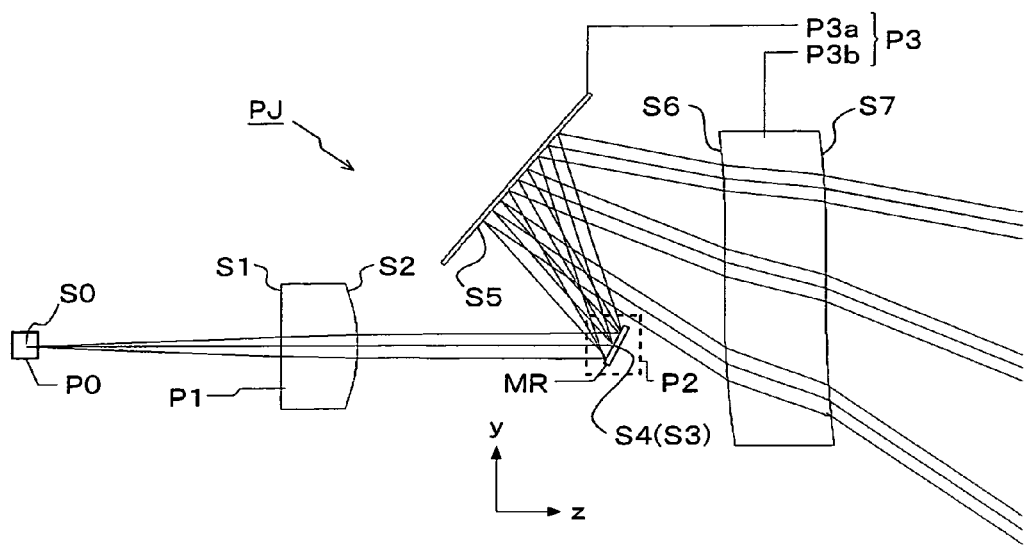
FIG. 3 is a partially enlarged view showing the optical path and the optical configuration in the vertical scanning cross section according to the first embodiment (Example 1)
Figure 4:
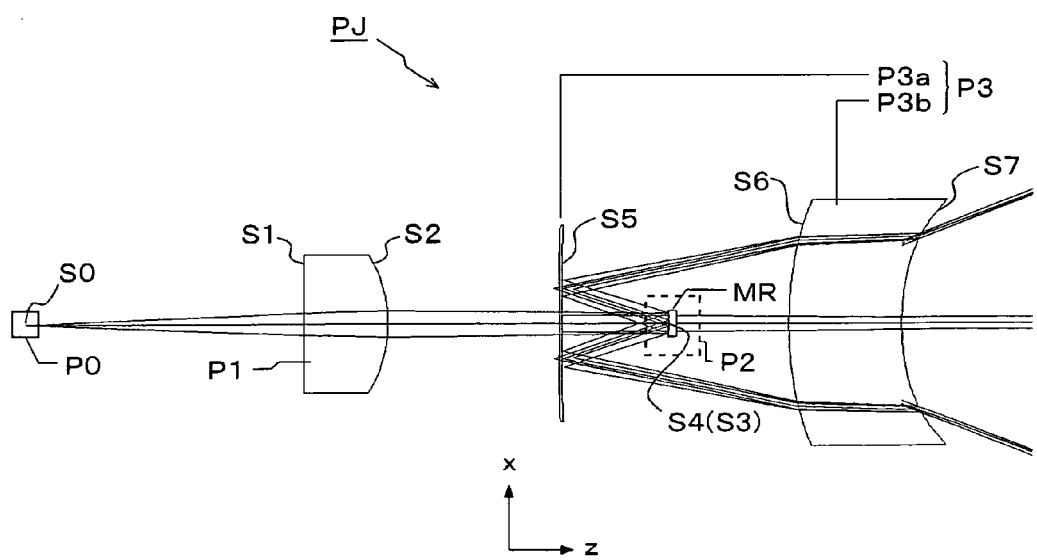
FIG. 4 is a partially enlarged view showing the optical path and the optical configuration in the horizontal scanning cross section according to the first embodiment (Example 1)
Figure 7:
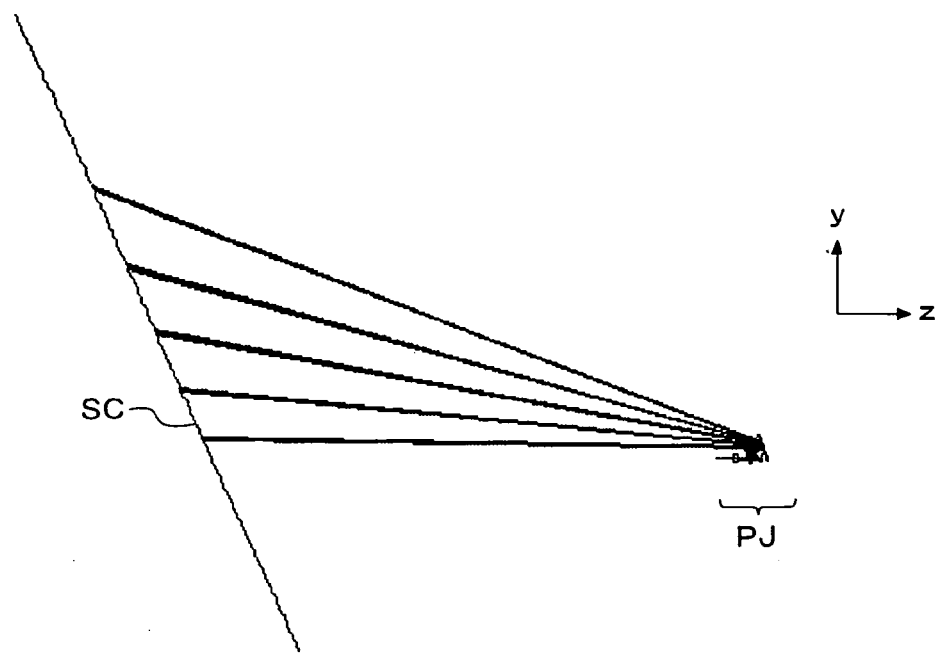
FIG. 7 is an overall view showing an optical path and optical configuration in a vertical scanning cross section according to a second embodiment (Example 2) of the present invention.
Figure 8:
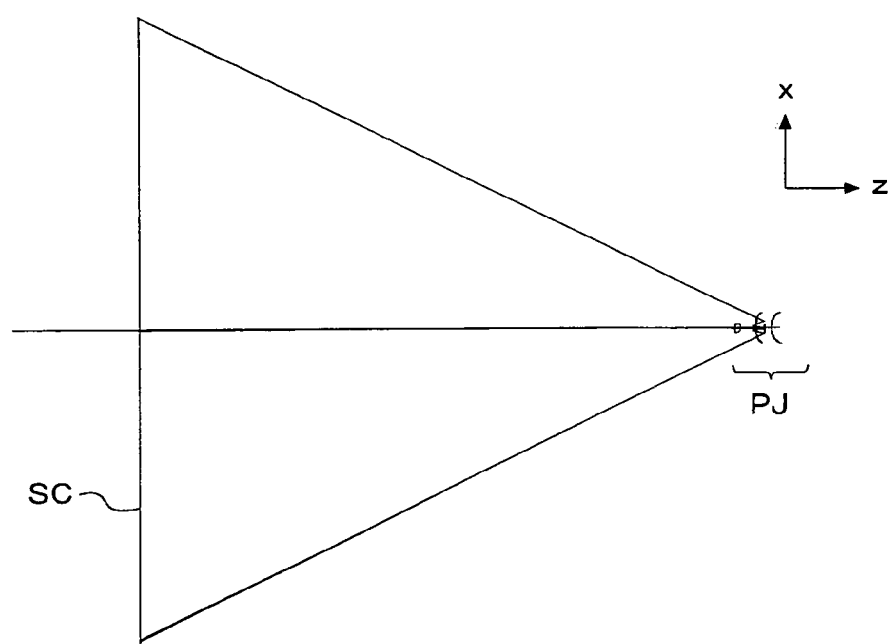
FIG. 8 is an overall view showing an optical path and optical configuration in a horizontal scanning cross section according to the second embodiment (Example 2)
Figure 9:
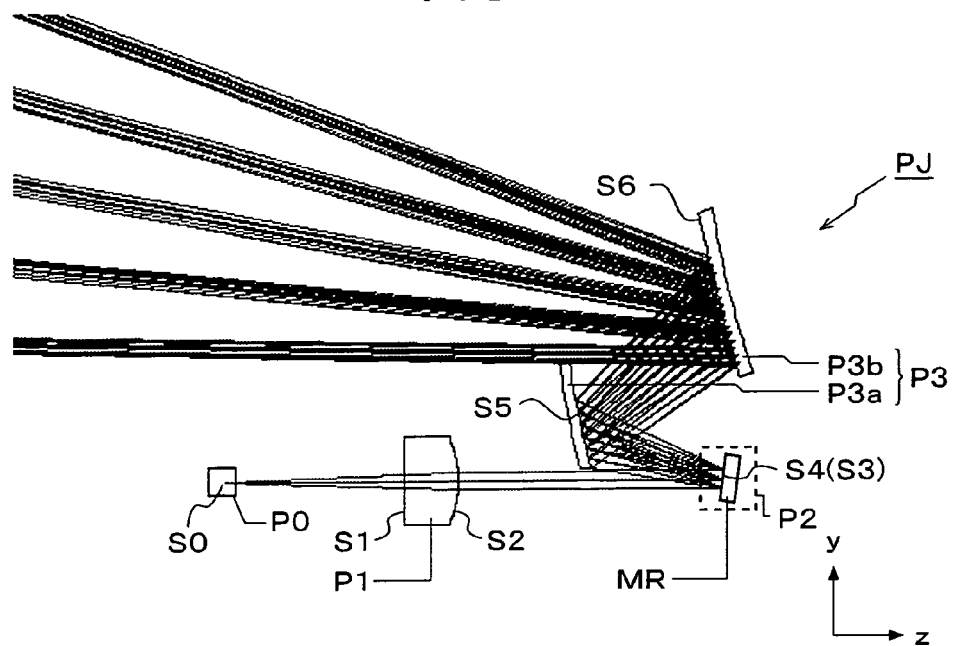
FIG. 9 is a partially enlarged view showing the optical path and the optical configuration in the vertical scanning cross section according to the second embodiment (Example 2)
Figure 10:
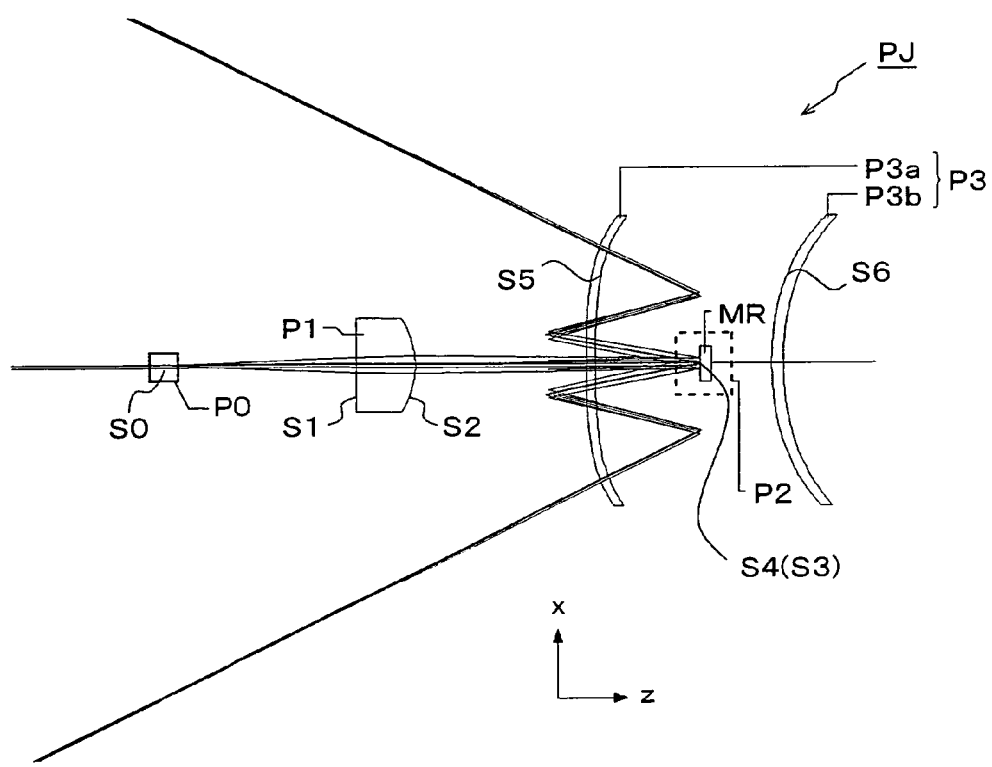
FIG. 10 is a partially enlarged view showing the optical path and the optical configuration in the horizontal scanning cross section according to the second embodiment (Example 2)

Next, referring to first and second embodiments, detailed optical configuration of the laser projection device according to the invention will be described. FIG. 1 shows an entire optical path and entire optical configuration in a vertical scanning cross section according to the first embodiment. FIG. 2 shows an entire optical path and entire optical configuration in a horizontal scanning cross section according to the first embodiment. FIG. 3 shows, on an enlarged scale, part of the optical path and the optical configuration in the vertical scanning cross section according to the first embodiment. FIG. 4 shows, on an enlarged scale, part of the optical path and the optical configuration in the horizontal scanning cross section according to the first embodiment. FIG. 7 shows an entire optical path and entire optical configuration in a vertical scanning cross section according to the second embodiment. FIG. 8 shows an entire optical path and entire optical configuration in a horizontal scanning cross section according to the second embodiment. FIG. 9 shows, on an enlarged scale, part of the optical path and the optical configuration in the vertical scanning cross section according to the second embodiment. FIG. 10 shows, on an enlarged scale, part of the optical path and the optical configuration in the horizontal scanning cross section according to the second embodiment.

A laser projection device PJ of each of the embodiments is composed of: a laser light source P0, an incidence optical system P1 that condenses laser light emitted from the laser light source P0, a scanning device P2 that deflects the laser light exiting from the incidence optical system P1 in mutually orthogonal vertical scanning direction and horizontal scanning direction with the mirror MR, and a projection optical system P3 that guides the laser light deflected by the scanning device P2 to a screen surface SC.

The incidence optical system P1 is formed with one anamorphic lens having different optical powers in the horizontal scanning direction and the vertical scanning direction.

Laser light emitted from the laser light source P0 passes through the incidence optical system P1, and thereby is made incident on the mirror MR of the scanning device P2 as convergent light in the horizontal scanning direction and as substantially parallel light in the vertical scanning direction. The projection optical system P3 has a negative optical power in the horizontal scanning direction and a weak optical power in the vertical scanning direction. The projection optical system P3 is composed of: in order from the laser light source P0 side, a first scanning optical element P3a and a second scanning optical element P3b. The first scanning optical element P3a has a stronger positive power toward the periphery in the horizontal scanning direction, and the second scanning optical element P3b has a stronger negative optical power toward the periphery in the horizontal scanning direction.

In the first embodiment, a mirror is used as the first scanning optical element P3a and a lens is used as the second scanning optical element P3b. That is, the projection optical system P3 of the first embodiment has a mirror and a lens as optical elements each having an optical power. In the second embodiment, mirrors are used as the first scanning optical element P3a and the second scanning optical element P3b. That is, the projection optical system P3 of the second embodiment has only two reflective surfaces as optical surfaces each having an optical power.

Figure 16:
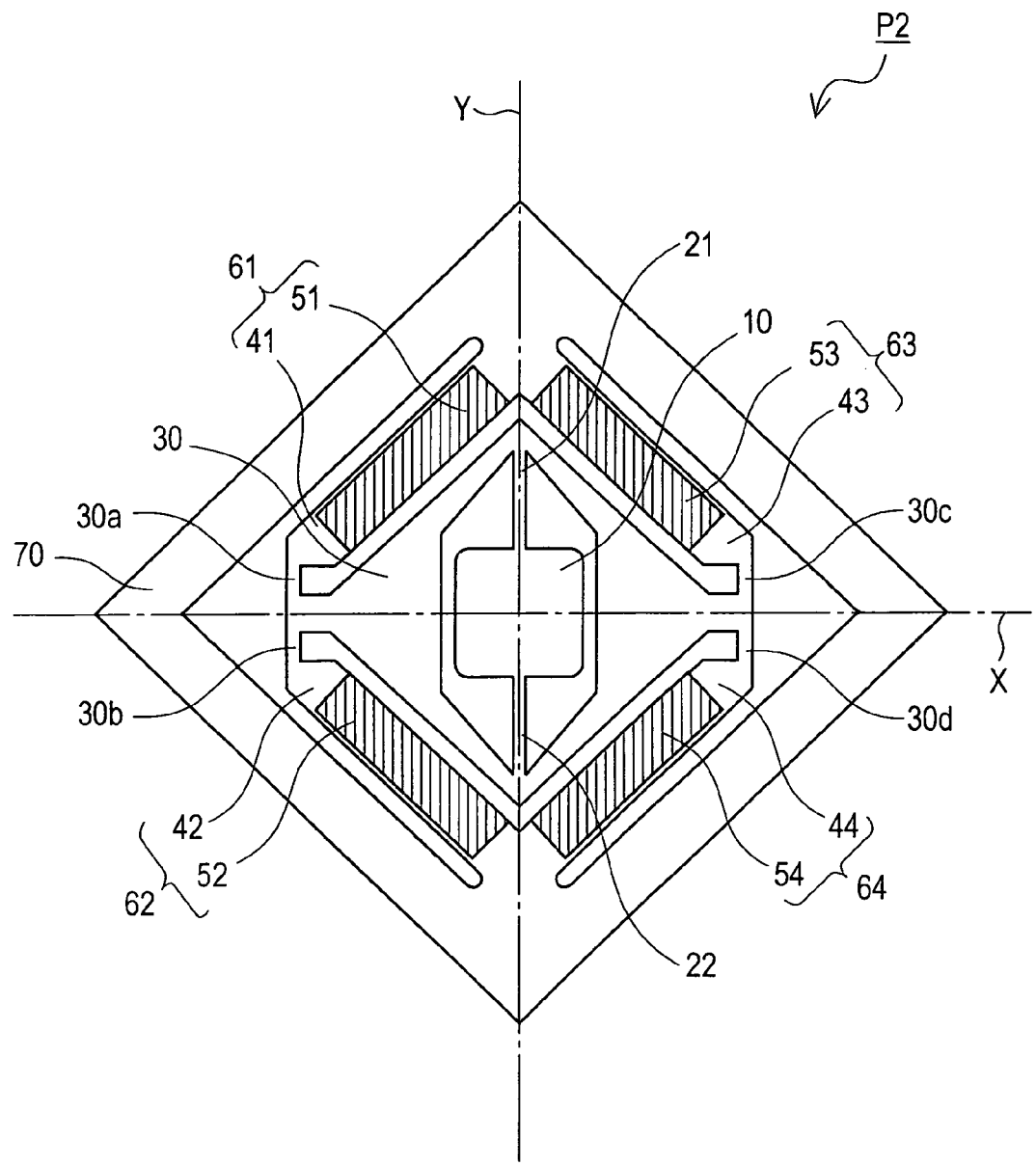
FIG. 16 is a plan view showing a MEMS mirror as one detailed example of a scanning device.

The scanning device P2 is adapted to perform deflection in the horizontal scanning direction by resonant driving of the mirror MR and perform deflection in the vertical scanning direction by non-resonant driving of the mirror MR. FIG. 16 shows one detailed example of the scanning device P2. This scanning device P2 is a MEMS mirror composed of a stationary frame 70, a movable frame 30, and a mirror part 10. The stationary frame 70 is a portion for fixing the scanning device P2 to a housing (not shown). Inside of the stationary frame 70, the movable frame 30 is formed as a movable portion in a frame-like shape. Inside of the movable frame 30, the mirror part 10 is formed in a square shape.

The mirror part 10 corresponds to the mirror MR, and is elastically supported to the movable frame 30 from the both sides by torsion bars 21 and 22 that extends outward along a Y-axis passing through the center of the mirror part 10 from opposing edges. The movable frame 30 is elastically supported to the stationary frame 70 from the both sides by bending beams 41 to 44 whose one ends are respectively connected to neighborhoods 30a to 30d near an X-axis extending orthogonally to the torsion bars 21 and 22 and passing through the center of the mirror part 10. The stationary frame 70, the bending beams 41 to 44, the movable frame 30, the mirror part 10, and the torsion bars 21 and 22 are integrally formed by anisotropic etching of a silicon substrate. On the mirror part 10, a reflective film of a metal thin film (gold, aluminum, or the like) is formed to increase the reflection rate of an incident ray.

On the surfaces of the bending beams 41 to 44, piezoelectric elements 51 to 54 are attached by bonding or otherwise, whereby four unimorph parts 61 to 64 are formed. The bending beams 41 to 44, due to bending deformation of the piezoelectric elements 51 to 54, cause rotary torques to act on the movable frame 30 independently for rotation about Y-axis and rotation about X-axis, and thus can rotate the movable frame 30 with respect to two axes, i.e., Y-axis and X-axis. Moreover, the bending beams 41 to 44 are arranged diagonally to the Y-axis and the X-axis. This permits elongating the bending beams 41 to 44 while compactly packing the scanning device P2, thus providing large displacement. In addition, the bending beams 41 to 44 are arranged in symmetry with the Y-axis and the X-axis therebetween, and thus can smoothly rotate the movable frame 30 without causing unbalanced vibration.

The rotating operation of the movable frame 30 will be described more in detail. On the front and rear of the piezoelectric elements 51 and 52, a top electrode and a bottom electrode are respectively provided. An alternate voltage is applied between them within a range that does not cause polarization inversion, whereby the piezoelectric elements 51 and 52 elongate and contract and are displaced in a unimorph thickness direction.

The operation of the rotation about the X-axis will be described. A voltage in the elongating direction is applied to the piezoelectric element 51 and a voltage in a phase opposite to the piezoelectric element 51 in the contracting direction is applied to the piezoelectric element 52. One end of each of the unimorph parts 61 and 62 is fixed to and held by the stationary frame 70; thus, the unimorph part 61 bends downward, while the unimorph part 62 bends upward. Similarly, when voltages in phases respectively equal to the piezoelectric elements 51 and 52 are applied to the piezoelectric elements 53 and 54, respectively, the unimorph part 63 bends downward, while the unimorph part 64 bends upward. Consequently, a rotary torque about the X-axis acts on the movable frame 30, which tilts about the X-axis in one direction. When voltages in phases opposite to those described above are applied to the piezoelectric elements 51 to 54, a rotary torque about the X-axis acts, in the same principle, on the movable frame 30, which tilts about the X-axis in the direction opposite to the aforementioned direction.

When alternate voltages kept in the phase relation described above are applied to the piezoelectric elements 51 to 54, the unimorph parts 61 to 64, following the alternate voltages, repeat vertical vibration and a see-saw like rotary torque acts on the movable frame 30, which rotationally vibrates about the X-axis up to a predetermined angle of displacement. The portions 30a to 30d where the unimorph parts 61 to 64 are connected to the movable frame 30 are narrow in width, and thus easier to bend than other portions. Thus, slight bending of the unimorph parts 61 to 64 greatly tilts the movable frame 30 near the X-axis, thereby permitting the mirror part 10 to be greatly tilted. The connection parts 30a to 30d, instead of being narrowed down in width, may be made thinner in thickness than the other portions.

Next, the operation of the rotation about the Y-axis will be described. When a voltage in the elongating direction is applied to the both piezoelectric elements 51 and 52, the both unimorph parts 61 and 62 bend downward since one end of each of the unimorph parts 61 and 62 is fixed to and held by the stationary frame 70. On the other hand, when a voltage in phase opposite to the piezoelectric elements 51 and 52 and in the contracting direction is applied to the piezoelectric elements 53 and 54, the both unimorph parts 63 and 64 bend upward. Consequently, a rotary torque about the Y-axis acts on the movable frame 30, which tilts about the Y-axis.

When alternate voltages kept in the phase relation described above are applied to the piezoelectric elements 51 to 54, the unimorph parts 61 and 64, following the alternate voltages, repeat vertical vibration and a see-saw like rotary torque acts on the movable frame 30, which rotationally vibrates about the Y-axis up to a predetermined angle of displacement. Application of predetermined voltages respectively to the unimorph parts 61 to 64 permits arbitrary control of tilts of the mirror part 10 supported by the movable frame 30 about the X-axis and the Y-axis. Since the deflection can be achieved without adding a force directly to the mirror part 10, deformation of the mirror part 10 is suppressed, and thus distortion and shift of a reflective ray are small. Consequently, a high-definition image can be formed. Moreover, the bending beams 41 to 44 are arranged in symmetry with the Y-axis and the X-axis therebetween, and the piezoelectric elements 51 to 54 respectively provided at the bending beams 41 to 44 are driven by driving signals in the same phases or mutually different phases inverted by 180 degrees. Thus the movable frame 30 can be independently rotated with respect to two axes, i.e., the Y-axis and the X-axis without being vibrated in an unbalanced manner.

Next, raster scanning by the laser projection device PJ loaded with the scanning device P2 will be described. The unimorph parts 61 to 64 are connected to the movable frame 30 at the X-axis neighborhoods 30a to 30b. Thus, even slight displacement of the unimorph parts 61 to 64 permits the movable frame 30 to greatly rotate about the X-axis. Therefore, the rotation about the X-axis (that is, vertical scanning) can be achieved by the aforementioned driving method. On the other hand, the connection positions 30a to 30d where the unimorph parts 61 to 64 are connected to the movable frame 30 are separated from the Y-axis, which makes it difficult for the movable frame 30 to greatly rotate about the Y-axis. Thus, the rotation about the Y-axis is achieved by vibrating the movable frame 30 with an around-Y-axis resonance frequency provided by twisting vibration of the torsion bars 21 and 22. Consequently, the vibration excites the mirror part 10, which can perform horizontal scanning at large amplitude. That is, raster scanning can be performed with a required frequency and required amplitude in the following manner. For a required horizontal scanning frequency, the around-Y-axis resonance frequency is set based on the length and width of the torsion bars 21 and 22, the inertia moment of the mirror part 10, etc, and then the piezoelectric elements 51 to 54 are driven by a driving signal in which an around-X-axis vibration frequency (vertical scanning frequency) and the around-Y-axis resonance frequency (horizontal scanning frequency) are superimposed on each other.

Figure 15A:
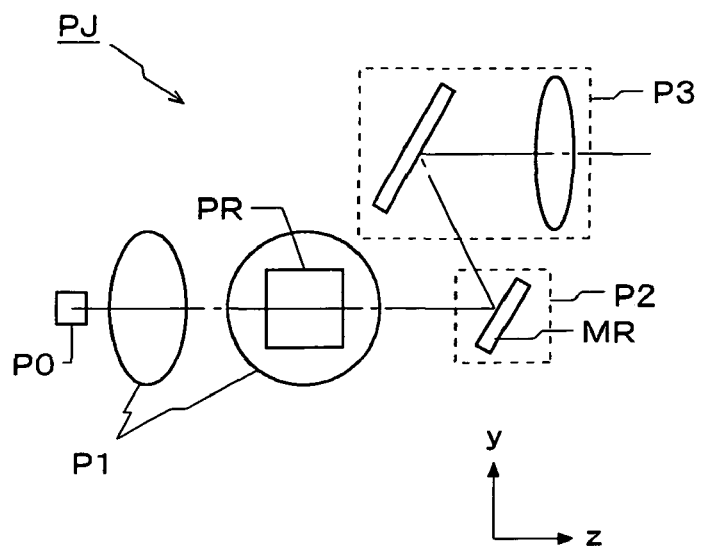
FIGS. 15A and 15B are pattern diagrams showing one embodiment of a full color laser projection device.
Figure 15B:
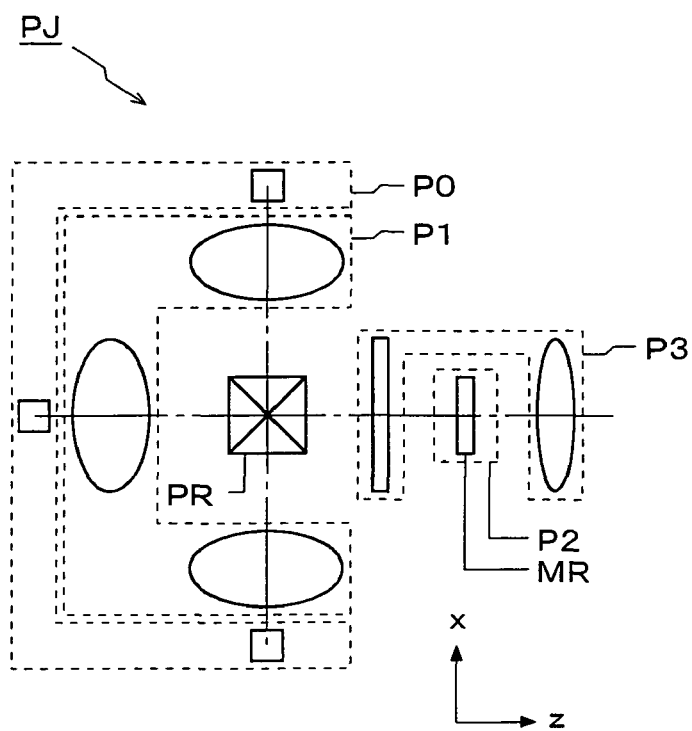

The first and second embodiments are adapted to perform monochromatic image projection. To provide a laser projection device that performs full-color image projection, R, G, and B laser light sources can be prepared so that light is made incident on the scanning device P2 after subjected to color synthesis with an optical element (for example, a dichroic mirror or a dichroic prism). FIGS. 15A and 15B show one embodiment of a laser projection device PJ that performs full-color image projection with R, G, B laser light sources P0 and a cross dichroic prism PR. FIG. 15A is a vertical scanning cross section, and FIG. 15B is a horizontal scanning cross section.

With the laser projection device that performs full-color image projection, the presence of a refractive lens in the projection optical system P3 causes chromatic aberration. The chromatic aberration includes two types, chromatic aberration of magnification and axial chromatic aberration. The axial chromatic aberration can be corrected by changing the distance of each laser light source P0 from the incidence optical system P1. The chromatic aberration of magnification can be optically corrected by using an achromatic lens or the like, although this leads to upsizing of the optical system. Thus, it is preferable that the position of light emission of each color be adjusted by electronically correcting modulation of the laser light source at scanning. More preferably, the projection optical system P3 is formed with a reflection system only as in the second embodiment (FIGS. 7 to 10). Forming the projection optical system P3 with a reflection system only does not cause chromatic aberration, and thus also does not require chromatic aberration correction.

As in the embodiments, it is preferable that separation of a ray of light incident and a ray of light reflected on the mirror MR of the scanning device P2 be achieved by angular separation in the vertical scanning direction. This has merits of keeping symmetry in the horizontal scanning direction and also achieving oblique projection to be described later. Moreover, a TIR (Total Internal Reflection) prism or a reflective polarizing plate may be used for the separation of the incident ray of light and the reflective ray of light.

In the embodiments, an oblique projection optical system is formed such that the angle of incidence of a ray at an image plane center onto the screen surface SC is not zero degrees. Since the screen is usually oriented vertically, when the length of a light path from the laser projection device to the screen are the same, the oblique projection optical system can provide a shorter distance from the projection device to the screen, and thus is more convenient. In oblique projection, distortion at the top right and bottom right of an image plane and imaging relationship are maintained, and thus favorable characteristics can be provided by introducing a free curved surface to the projection optical system.

As can be understood from the above description, the aforementioned embodiments and examples below include the following configuration of a laser projection device. With this configuration, a laser projection device can be achieved which can provide a high-quality, bright image without distortion in two-dimensional scanning while being compact in size.

(T1) A laser projection device including: a laser light source, an incidence optical system condensing laser light emitted from the laser light source, a scanning device deflecting the laser light exiting from the incidence optical system with a mirror in mutually orthogonal first scanning direction and second scanning direction, and a projection optical system guiding the laser light deflected by the scanning device to a surface to be scanned, wherein the scanning device performs the deflection in the first scanning direction by resonant driving of the mirror and performs the deflection in the second scanning direction by non-resonant driving of the mirror, wherein the incidence optical system is formed of an anamorphic optical system having different optical powers in the first scanning direction and the second scanning direction and makes convergent light incident on the mirror in the first scanning direction and makes parallel or substantially parallel light incident thereon in the second scanning direction, and wherein the projection optical system has a negative optical power in the first scanning direction.

(T2) The laser projection device according to the above (T1), wherein the mirror is formed of one mirror for two-dimensional scanning that performs the deflection in the first scanning direction and the deflection in the second scanning direction.

(T3) The laser projection device according to the above (T1), wherein the mirror is formed of: a first mirror for one-dimensional scanning that performs the deflection in the first scanning direction; and a second mirror for one-dimensional scanning that performs the deflection in the second scanning direction.

(T4) The laser projection device according to any one of the above (T1) to (T3), wherein the projection optical system is formed of at least two optical elements, one of which has a stronger positive optical power toward the periphery in the first scanning direction, and the other of which has a stronger negative optical power toward the periphery in the first scanning direction.

(T5) The laser projection device according to any one of the above (T1) to (T4), wherein at least one of the above conditional formulae (1), (2), (3), (1a), (2a), and (3a) is satisfied.

(T6) The laser projection device according to any one of the above (T1) to (T5), wherein the projection optical system has, as optical elements each having an optical power, a mirror and a lens.

(T7) The laser projection device according to any one of the above (T1) to (T5), wherein the projection optical system has, as optical surfaces each having an optical power, only two reflective surfaces.

(T8) The laser projection device according to any one of the above (T1) to (T7), wherein the projection optical system has a positive optical power in the second scanning direction.

(T9) The laser projection device according to any one of the above (T1) to (T8), wherein the mirror is a MEMS mirror.

EXAMPLES

Hereinafter, the projection optical system according to the present invention will be further described in detail, with construction data and other data. Examples 1 and 2 presented below are numerical examples corresponding to the first and second embodiments, respectively, described hereinbefore, and therefore the optical configuration diagrams (FIGS. 1 to 4, and 7 to 10) of the first and second embodiments also show the corresponding optical configuration, optical paths, etc. of Examples 1 and 2, respectively.

Tables 1 to 3 and Tables 4 to 6 show the construction data for the first and second embodiments, respectively. Table 7 show corresponding and related data for the conditional formulae, referring to Examples 1 and 2, and Comparative Examples 1 and 2. Of Examples 1 to 3 described in JP-A-2006-178346, Example 1 corresponds to Comparative Example 1, and Example 3 corresponds to Comparative Example 2. For Example 2 described in JP-A-2006-178346, information related to the object point position is not clear, and thus calculation is not performed.

In Tables 1 and 4, Si (i=0, 1, 2, 3, . . . ) represents the i-th surface counted from the laser light source PO side, RYi (i=0, 1, 2, 3, . . . ) represents the radius of curvature (in mm) of the surface Si in the Y-direction, and RXi (i=0, 1, 2, 3, . . . ) represents the radius of curvature (in mm) of the surface Si in the X-direction. Note that the X-direction and the Y-direction are coordinate axis directions in an orthogonal coordinate system (X, Y, Z) where the vertex of the surface Si is an origin and a normal line at the vertex is Z-axis.

The arrangement of each surface Si in Examples 1 and 2 is specified by corresponding surface data including vertex coordinates (x, y, z) and the rotation angle (for X-rotation) in Tables 2 and 5. The vertex coordinates of the surface Si are expressed (in mm) by coordinates (x, y, z) of an origin in a local orthogonal coordinate system (X, Y, Z) in a global orthogonal coordinate system (x, y, z), where the origin in the local orthogonal coordinate system (X, Y, Z) is a vertex of the vertex coordinates. The tilt of the surface Si is expressed by the rotation angle (in °: direction counterclockwise to the X-axis positive direction is a positive direction of the rotation angle in the X-rotation) about the X-axis (X-rotation) with respect to the vertex serving as a center. Note that the coordinate systems are all defined by a right-handed system, and that the global orthogonal coordinate system (x, y, z) is an absolute coordinate system in agreement with a local orthogonal coordinate system (X, Y, Z) of the pupil S3.

The surfaces Si each formed of a free curved surface are defined by a formula (FS) below using a local orthogonal coordinate system (X, Y, Z) with the vertex of the surface Si serving as an origin. Tables 3 and 6 show free curved surface data of respective Examples. It should be noted that any coefficient that is not shown equals 0 (k=0 in both the X-direction and the Y-direction for all the free curved surfaces) and that, for all the data, "E-n" represents "×10$^{-n}$".

$$Z = (C0 \cdot H^2) / \left[ 1 + \sqrt{1 - (1+K) \cdot C0^2 \cdot H^2} \right] + \sum \{A(j,k) \cdot X^j \cdot Y^k\}, \quad \text{(FS)}$$

where
- z represents the displacement in the Z-axis direction at a height H (relative to the vertex);
- H represents a height in a direction perpendicular to the Z-axis ($H^2 = X^2 + Y^2$);
- C0 represents a curvature at the vertex (=the reciprocal of a radius of curvature);
- K represents a conic coefficient; and
- A(j, k) represents a free curved surface coefficient of the j-th order and k-th order for X and Y, respectively.

The Examples assume a MEMS mirror as a deflection mirror MR loaded in the scanning device P2. In Example 1, a mechanical scanning angle in the horizontal scanning direction (X-direction) is ±6 degrees, and a mechanical scanning angle in the vertical scanning direction (Y-direction) is ±8 degrees. In terms of time involved in scanning, 75% of these angle ranges is used for both the horizontal scanning direction and the vertical scanning direction, and angles used is ±5.54 degrees for the horizontal scanning direction and ±6 degrees for the vertical scanning direction. In Example 2, the mechanical scanning angle for the horizontal scanning direction (X-direction) is ±5.7 degrees, and the mechanical scanning angle for the vertical scanning direction (Y direction) is ±5.3 degrees. In terms of time involved in scanning, 75% of these angle ranges is used for both the horizontal scanning direction and the vertical scanning direction, and angles used is ±5.27 degrees for the horizontal scanning direction and ±4 degrees for the vertical scanning direction. The effective diameter (pupil diameter) of the MEMS is 1 mm for the both Examples.

Figure 5:
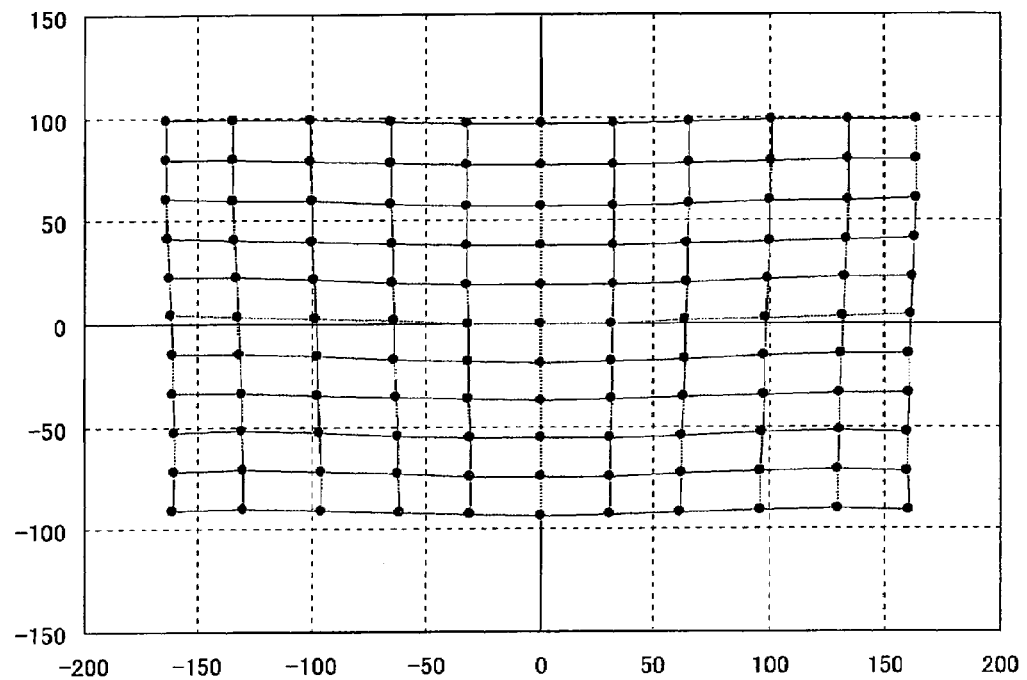
FIG. 5 is a distortion diagram of Example 1.
Figure 6:
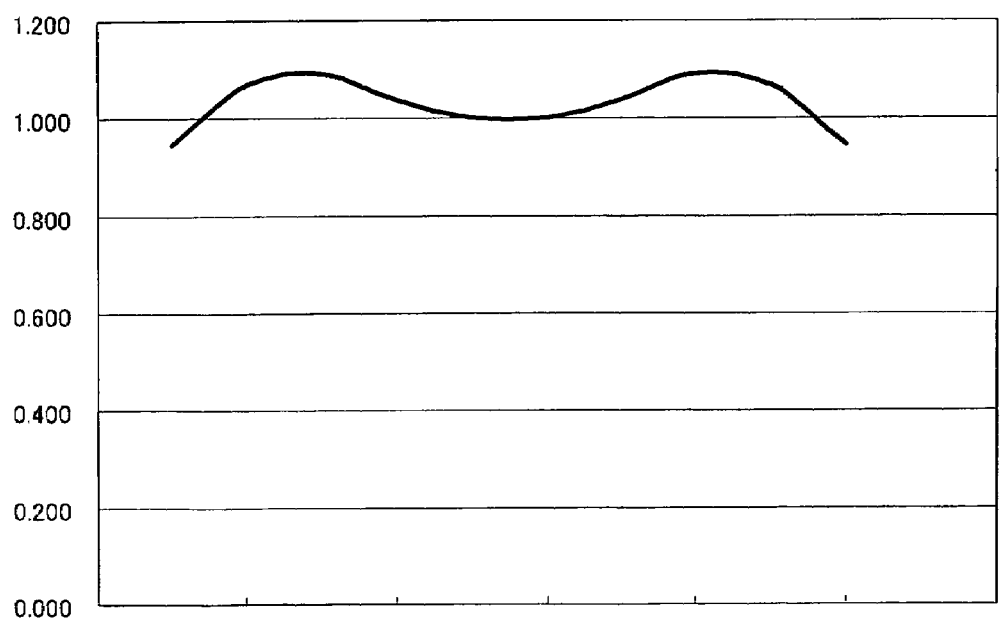
FIG. 6 is a graph showing speed distribution in horizontal scanning on an image plane center according to Example 1.
Figure 11:
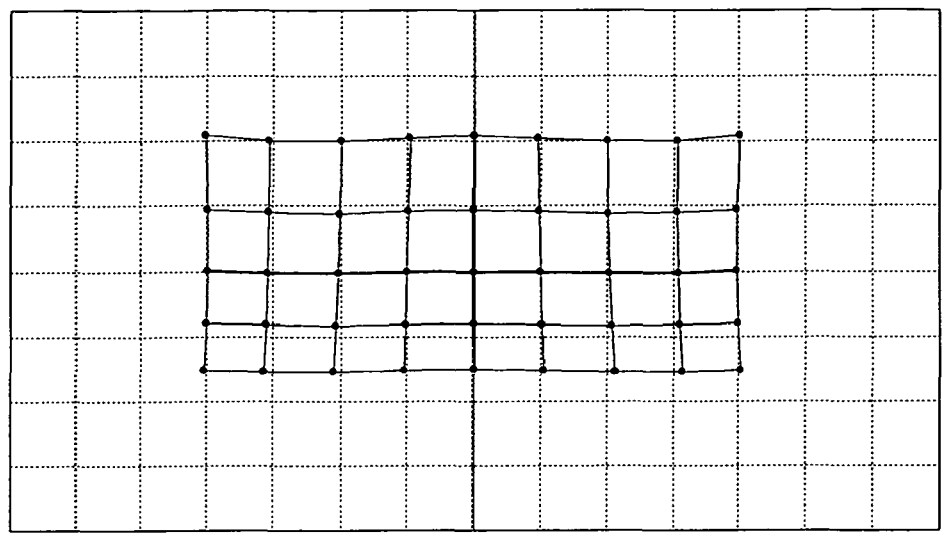
FIG. 11 is a distortion diagram of Example 2.
Figure 12:
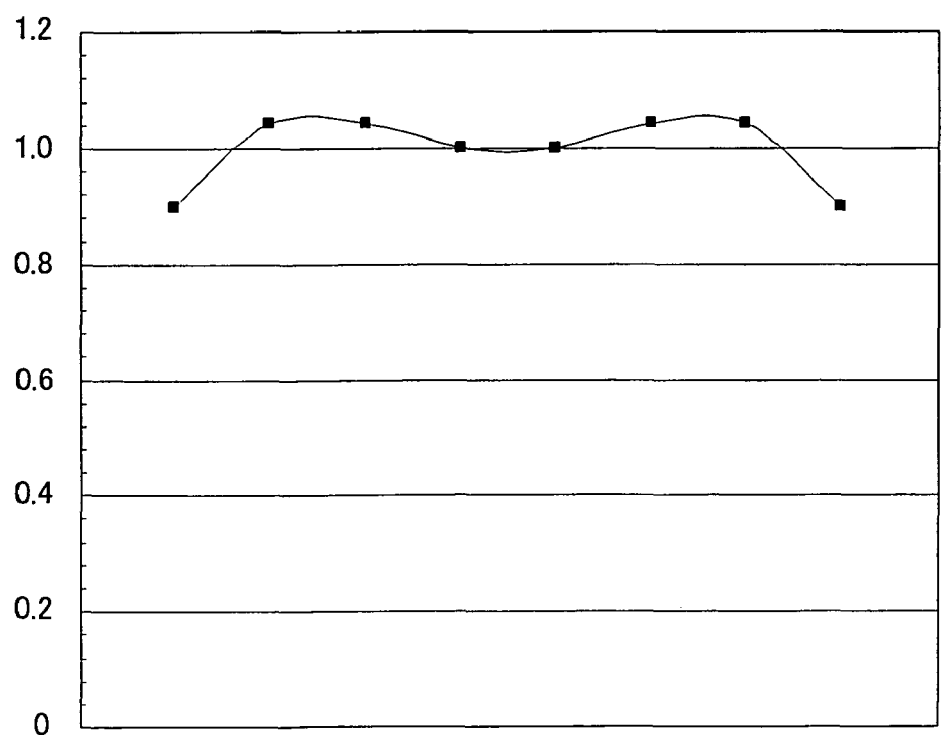
FIG. 12 is a graph showing speed distribution in horizontal scanning on an image plane center according to Example 2.

FIGS. 5 and 11 show distortion in a two-dimensional image in Examples 1 and 2, respectively, with distortion diagrams (where the vertical axis represents the Y-direction (vertical scanning direction), the horizontal axis represents the X-direction (horizontal scanning direction), the unit is mm, and the scale is 50 mm for one square). Each of the distortion diagrams plots at equal intervals the position of a ray of light on the screen surface SC as a result of deflection and scanning with the mirror MR. FIGS. 6 and 12 show relative speed ratios for horizontal scanning in Examples 1 and 2, respectively, with speed distribution diagrams (where the vertical axis represents the relative speed ratio, the horizontal axis represents the X-direction (horizontal scanning direction), and the scanning range is ±150 mm). Each of the speed distribution diagrams represents the relative horizontal scanning speed ratio with respect to the image plane center of a two-dimensional image. Passage of laser light through the projection optical system P3 maintains the constant speed performance in horizontal scanning, so that a change in the scanning speed falls in a narrow range.

In the Examples, as can be seen from FIGS. 5, 6, 11, and 12, the distortion of the two-dimensional image is small and the constant speed performance is within ±5 to 10%, thus permitting achieving a very compact optical system. Although the scanning angle of the mirror MR is smaller in the horizontal scanning direction, a horizontally long (approximately 4:3) projection image plane can be achieved, and the scanning angle by horizontal scanning at high-speed driving is small. Consequently, loads involved in designing and manufacturing the MEMS mirror can be greatly reduced, which results in cost reduction. Moreover, the driving voltage (power) of the MEMS mirror can be reduced, which can contribute to energy saving.

TABLE 1

Example 1

| Si | Surface type | RYi | RXi | Material | Component, etc. | | |
|---|---|---|---|---|---|---|---|
| S0 | Standard | ∞ | ∞ | | Object surface | P0 | |
| S1 | Standard | ∞ | ∞ | BK7 | Lens incidence surface | P1 | |
| S2 | XY curved surface | −6.568495 | −4.8139557 | | Lens exit surface | | |
| S3 | Standard | ∞ | ∞ | | (Pupil) | | |
| S4 | Standard | ∞ | ∞ | Mirror | MEMS mirror | MR | P2 |
| S5 | Free curved surface | ∞ | ∞ | Mirror | Reflective surface | P3a | P3 |
| S6 | Free curved surface | 267.5878 | 267.5878 | BK7 | Lens incidence surface | P3b | |
| S7 | Free curved surface | ∞ | ∞ | | Lens exit surface | | |
| SC | Standard | ∞ | ∞ | | Screen surface | | |

TABLE 2

Example 1

| | Vertex coordinates | | | Rotation angle |
|---|---|---|---|---|
| Si | x | y | z | X rotation |
| S0 | 0 | 0 | −23 | 0 |
| S1 | 0 | 0 | −13 | 0 |
| S2 | 0 | 0 | −10 | 0 |
| S3 | 0 | 0 | 0 | 0 |
| S4 | 0 | 0 | 0 | −30 |
| S5 | 0 | 6.532 | −3.771 | −41.044 |
| S6 | 0 | 2.217 | 4.305 | 0 |
| S7 | 0 | 2.217 | 8.305 | 0 |
| SC | 0 | −162.133 | 408.305 | −32.184 |

TABLE 3

Example 1 (Free curved surface coefficient)

| A(j, k) | S5 | S6 | S7 |
|---|---|---|---|
| A(2, 0) | −7.485E−03 | 3.357E−02 | 5.392E−02 |
| A(0, 2) | 1.896E−03 | 4.207E−03 | 2.256E−03 |

TABLE 3-continued

Example 1 (Free curved surface coefficient)

| A(j, k) | S5 | S6 | S7 |
|---|---|---|---|
| A(2, 1) | 3.027E−04 | 6.830E−04 | 2.272E−03 |
| A(0, 3) | 1.068E−04 | −1.483E−03 | −1.395E−03 |
| A(4, 0) | 9.262E−04 | 2.811E−04 | 1.350E−03 |
| A(2, 2) | −1.814E−04 | −1.120E−04 | −3.043E−04 |
| A(0, 4) | 6.217E−06 | −8.905E−05 | −3.645E−05 |
| A(4, 1) | −2.084E−05 | 9.397E−05 | 1.598E−04 |
| A(2, 3) | −3.050E−05 | −3.637E−05 | −4.683E−05 |
| A(0, 5) | 1.518E−06 | −2.376E−07 | 1.829E−06 |

TABLE 4

Example 2

| Si | Surface type | RYi | RXi | Material | Component, etc. | | |
|---|---|---|---|---|---|---|---|
| S0 | Standard | ∞ | ∞ | | Object surface | P0 | |
| S1 | Standard | ∞ | ∞ | BK7 | Lens incidence surface | P1 | |
| S2 | XY curved surface | −6.568495 | −4.8474828 | | Lens exit surface | | |
| S3 | Standard | ∞ | ∞ | | (Pupil) | | |
| S4 | Standard | ∞ | ∞ | Mirror | MEMS mirror | MR | P2 |
| S5 | Free curved surface | ∞ | ∞ | Mirror | Reflective surface | P3a | P3 |
| S6 | Free curved surface | ∞ | ∞ | Mirror | Reflective surface | P3b | |
| SC | Standard | ∞ | ∞ | | Screen surface | | |

TABLE 5

Example 2

| | Vertex coordinates | | | Rotation angle |
|---|---|---|---|---|
| Si | x | y | z | X rotation |
| S0 | 0 | 0 | −28 | 0 |
| S1 | 0 | 0 | −18 | 0 |
| S2 | 0 | 0 | −15 | 0 |
| S3 | 0 | 0 | 0 | 0 |
| S4 | 0 | 0 | 0 | −8.5 |
| S5 | 0 | −7.398 | −5.429 | 15.17 |
| S6 | 0 | −3.083 | 3.728 | 18.714 |
| SC | 0 | 83.253 | −393.929 | 24.075 |

TABLE 6

Example 2 (Free curved surface coefficient)

| A(j, k) | S5 | S6 |
|---|---|---|
| A(2, 0) | 7.530E−03 | 3.351E−02 |
| A(0, 2) | 1.759E−03 | −7.279E−04 |
| A(0, 3) | −2.237E−04 | 1.135E−04 |
| A(4, 0) | 3.451E−04 | 2.657E−04 |
| A(2, 2) | −1.759E−04 | −1.779E−04 |
| A(0, 4) | 3.156E−05 | 3.911E−06 |
| A(2, 3) | 6.352E−06 | 4.571E−06 |
| A(0, 5) | −8.205E−07 | −5.928E−08 |

TABLE 7

| Conditional formulae | (1), (1a) | (2), (2a) | (3), (3a) |
|---|---|---|---|
| | S(objH)/L | |S(objV)|/L | pwH/pwV |
| Example1 | 0.054 | ∞ | 1.364 |
| Example2 | 0.057 | ∞ | 1.355 |

TABLE 7-continued

| Conditional formulae | (1), (1a) | (2), (2a) | (3), (3a) |
|---|---|---|---|
| Comparative Example 1 | 0.507 | 0.507 | 1 |
| Comparative Example 2 | 0.450 | 0.450 | 1 |
| | L | S(objH) | S(objV) |
| Example1 | 400 | 21.693 | ∞ |
| Example2 | 401 | 22.709 | ∞ |
| Comparative Example 1 | 240 | 121.6 | 121.6 |
| Comparative Example 2 | 278 | 125 | 125 |

What is claimed is:

1. A laser projection device comprising:
a scanning device performing deflection in a first scanning direction by resonant driving and performing deflection in a second scanning direction by non-resonant driving;
an incidence optical system having different optical powers in the first scanning direction and the second scanning direction, the incidence optical system making light incident on the scanning device in a convergent state in the first scanning direction and in a substantially parallel light state in the second scanning direction; and
a projection optical system having a negative optical power as a whole in the first scanning direction.

2. The laser projection device according to claim 1, wherein the projection optical system is formed of at least two optical elements, one of which has a stronger positive optical power toward periphery in the first scanning direction, and the other of which has a stronger negative optical power toward the periphery in the first scanning direction.

3. The laser projection device according to claim 1, wherein the scanning device performs each of the deflections by driving a mirror, and
wherein conditional formula (1) below is satisfied:

$$0.3 > S(objH)/L > 0.03 \quad (1),$$

where
S(objH) represents an object distance of the projection optical system with reference to the mirror in the first scanning direction; and
L represents a projection distance with reference to an optical surface which is included in the projection optical system and located on a side closest to a surface to be scanned.

4. The laser projection device according to claim 3, wherein conditional formula (1a) below is satisfied:

$$0.3 > S(objH)/L > 0.1 \quad (1a).$$

5. The laser projection device according to claim 1,
wherein the scanning device performs each of the deflections by driving a mirror, and
wherein conditional formula (2) below is satisfied:

$$|S(objV)|/L > 0.8 \quad (2),$$

where
S(objV) represents an object distance of the projection optical system with reference to the mirror in the second scanning direction; and
L represents a projection distance with reference to an optical surface which is included in the projection optical system and located on a side closest to a surface to be scanned.

6. The laser projection device according to claim 5,
wherein conditional formula (2a) below is satisfied:

$$|S(objV)|/L > 1.2 \quad (2a).$$

7. The laser projection device according to claim 1,
wherein conditional formula (3) below is satisfied:

$$3 > pwH/pwV > 1.2 \quad (3),$$

where
pwH represents an optical power of the incidence optical system in the first scanning direction; and
pwV represents an optical power of the incidence optical system in the second scanning direction.

8. The laser projection device according to claim 7,
wherein conditional formula (3a) below is satisfied:

$$2 > pwH/pwV > 1.3 \quad (3a).$$

9. The laser projection device according to claim 1,
wherein optical surfaces included in the projection optical system and each having an optical power are only two reflective surfaces.

10. A laser projection device comprising:
a laser light source;
an incidence optical system condensing laser light emitted from the laser light source;
a scanning device deflecting the laser light exiting from the incidence optical system with a mirror in a first scanning direction and a second scanning direction vertical to the first scanning direction; and
a projection optical system guiding the laser light exiting from the scanning device to a surface to be scanned,
wherein the incidence optical system makes the laser light convergent in the first scanning direction and substantially parallel light in the second scanning direction,
wherein the scanning device performs only the deflection in the first scanning direction by resonant driving, and
wherein the projection optical system is formed of two optical elements, one of which includes a reflective surface having a stronger positive optical power toward periphery in the first scanning direction, and the other of which has a stronger negative optical power toward the periphery in the first scanning direction, so that the projection optical system has a negative optical power in the first scanning direction as a whole.

11. The laser projection device according to claim 10,
wherein conditional formula (1) below is satisfied:

$$0.3 > S(objH)/L > 0.03 \quad (1),$$

where
S(objH) represents an object distance of the projection optical system with reference to the mirror in the first scanning direction; and
L represents a projection distance with reference to an optical surface which is included in the projection optical system and located on a side closest to a surface to be scanned.

12. The laser projection device according to claim 11,
wherein conditional formula (1a) below is satisfied:

$$0.3 > S(objH)/L > 0.1 \quad (1a).$$

13. The laser projection device according to claim 10,
wherein conditional formula (2) below is satisfied:

$$|S(objV)|/L > 0.8 \quad (2),$$

where
S(objV) represents an object distance of the projection optical system with reference to the mirror in the second scanning direction; and
L represents a projection distance with reference to an optical surface which is included in the projection optical system and located on a side closest to a surface to be scanned.

14. The laser projection device according to claim 13,
wherein conditional formula (2a) below is satisfied:

$$|S(objV)|/L > 1.2 \quad (2a).$$

15. The laser projection device according to claim 10,
wherein conditional formula (3) below is satisfied:

$$3 > pwH/pwV > 1.2 \quad (3),$$

where
pwH represents an optical power of the incidence optical system in the first scanning direction; and
pwV represents an optical power of the incidence optical system in the second scanning direction.

16. The laser projection device according to claim 15,
wherein conditional formula (3a) below is satisfied:

$$2 > pwH/pwV > 1.3 \quad (3a).$$

17. The laser projection device according to claim 10,
wherein the incidence optical system is formed of an anamorphic optical system having different optical powers in the first scanning direction and the second scanning direction.

18. The laser projection device according to claim 10,
wherein the mirror is formed of one mirror for two-dimensional scanning that performs the deflection in the first scanning direction and the deflection in the second scanning direction.

19. The laser projection device according to claim 10,
wherein the mirror comprises a first mirror for one-dimensional scanning that performs the deflection in the first scanning direction and a second mirror for one-dimensional scanning that performs the deflection in the second scanning direction.

20. The laser projection device according to claim 10,
wherein the projection optical system has a positive optical power in the second scanning direction.

* * * * *